Nov. 5, 1940.   E. E. WESTPHAL   2,220,361
SIDEHILL STEERING ATTACHMENT FOR TRACTORS
Filed Sept. 9, 1938
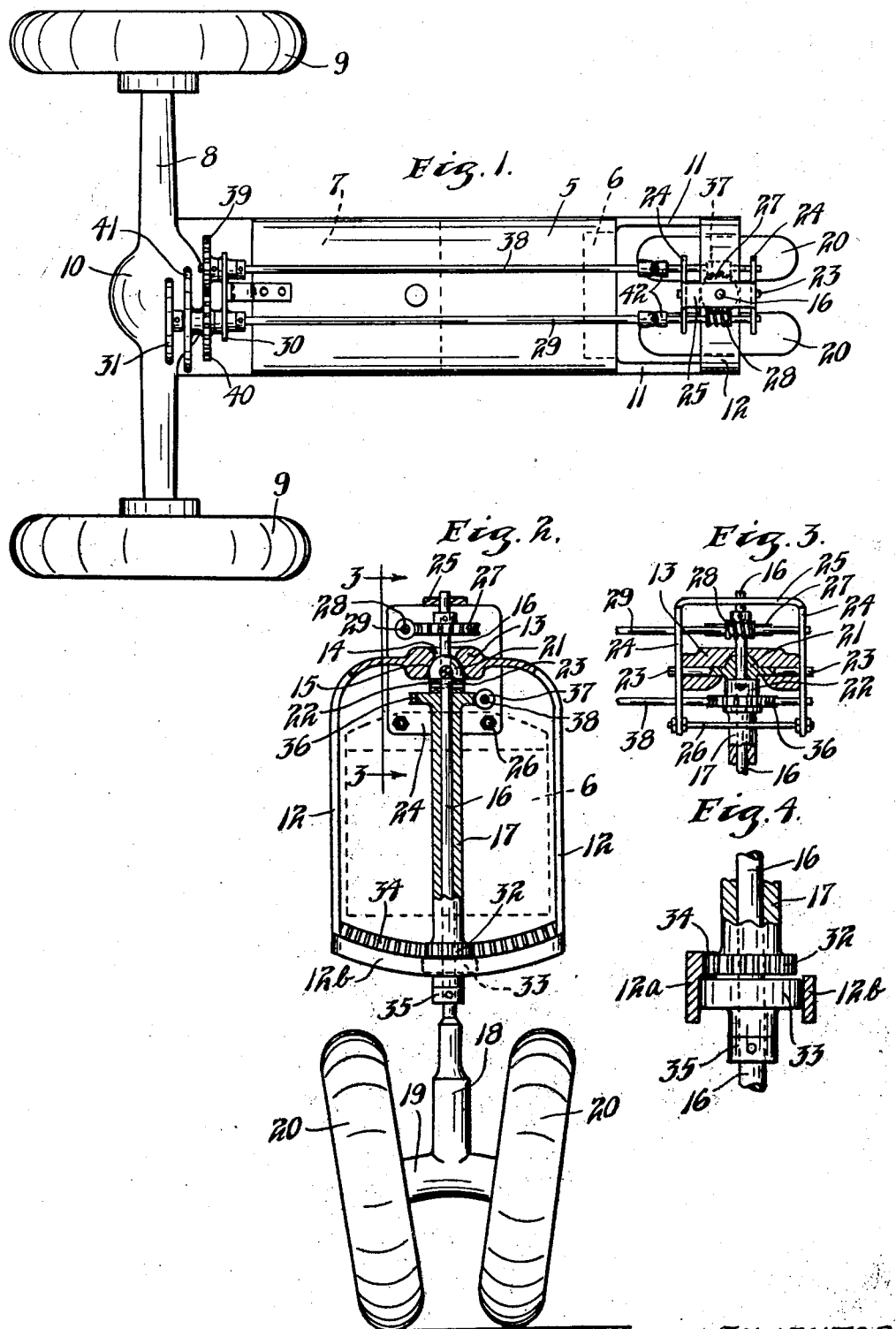
INVENTOR.
EDWARD E. WESTPHAL
BY HIS ATTORNEYS
Williamson & Williamson Patented Nov. 5, 1940

2,220,361

UNITED STATES PATENT OFFICE 2,220,361

SIDEHILL STEERING ATTACHMENT FOR TRACTORS

Edward E. Westphal, near Zimmerman, Minn.

Application September 9, 1938, Serial No. 229,118

5 Claims. (Cl. 280—87)

This invention relates to power machinery and more particularly to motor driven tractors which are used for cultivation on the farm.

In many farming sections where row crops are cultivated with the commonly known tractors it is extremely difficult to properly cultivate row crops when they are planted along inclined slopes. Most tractors are built so that each of the rear wheels will run between rows of crops separated from each other, and many modern tractor constructions include a central front wheel assembly which may be a single or double wheel and this front wheel assembly is adapted to travel between rows which separate the path of travel taken by the rear wheels between adjacent laterally disposed rows. On fairly steep slopes which are still useful for cultivation when the crop row is planted along the slope it is extremely difficult to cultivate the crop for the reason that the rear end of the tractor has a tendency to slip down the slope and in many cases run over the crop and destroy the same.

It is, therefore, a general object of my invention to provide a tractor suitable for cultivating row crops on comparatively steep slopes wherein the center of gravity of the machine may be shifted and the front centralized steering wheel assembly may be laterally shifted to overcome the tendency of the tractor to get out of proper alignment with respect to the row crops so that the track followed by both the front wheel assembly and the rear wheels will be properly aligned between the rows and the crop will not be damaged.

Another object of the invention is the provision of means for shifting the central front wheel assembly relative to the forward portion of the tractor by means of a control which can be actuated at will from the usual driver's seat.

A further object of the invention is the provision of a sidehill steering attachment for tractors which will permit not only lateral shifting of the front wheel assembly but which will also permit steering of said front wheel assembly regardless of the angle at which the assembly has been shifted.

These and other objects and advantages of the invention will more fully appear from the following description made in connection with the accompanying drawing, wherein like reference characters refer to the same or similar parts throughout the views, and in which:

Fig. 1 is a plan view showing the general outline of a tractor with my invention incorporated therewith;

Fig. 2 is a front elevation of my invention and parts of the supported portion of a tractor;

Fig. 3 is a vertical section taken approximately on the line 3—3 of Fig. 2; and

Fig. 4 is an enlarged fragmentary section through the lower central portion of the frame to which my invention is secured and showing portions of the steering column in elevation.

While in the drawing the tractor itself is illustrated more or less diagrammatically, it is assumed to be a tractor of general standard construction having a main body portion 5 within which is mounted the motor and in the forward portion of which is positioned the customary radiator 6 which generally extends upwardly to a point a little higher than the engine itself. Beneath the hood of the tractor and above the motor adjacent the rear thereof is the customary fuel tank 7, the upper portion of which is approximately the same height as the top of the radiator 6. The rear portion of the machine is mounted upon a rear axle 8 which carries the usual drive wheels 9. A seat not shown is customarily positioned above the axle adjacent the differential housing 10.

The forward ends of the tractor side frame members are shown in Fig. 1 at 11 and extending upwardly therefrom is a vertical frame element 12 which is roughly rectangular in shape. The upper cross-piece of the frame element 12 is provided with a reinforced portion 13 which has an aperture in the form of a laterally disposed slot 14, the latter communicating with a rounded concave socket 15 on the underside of the frame element. A steering post 16 extends through the opening formed by the communication between the cut-out 14 and the socket 15 and downwardly through a sleeve-like housing 17 to the upstanding portion of a stub axle housing 18. The housing 18 has branches 19 which carry stub axles (not shown), and wheels 20 are mounted thereon in any well known manner. A rounded bearing element 21 is mounted on the steering post 16 and is held against downward movement on said post by means of a collar 22 which is firmly secured to the steering post 16.

The bearing element 21 carries a pair of oppositely disposed stub shafts 23 which extend through suitable journalled openings in the reinforced frame portion 13 and thence through substantially centralized openings in a pair of spaced plates 24. The plates 24 are connected at their upper edges by means of a horizontally disposed strip 25.

The upper end of the steering post 16 is journalled. The lower portions of said plates 24 may be connected in any suitable manner such as by brace rods 26. The steering post 16 is adapted to rotate freely in the rounded bearing element 21, and since the pins 23 are mounted for free movement in the reinforced portion 13 of the frame and also in the plates 24, it will be seen that said steering post can be rotated and can also be moved to various angular positions laterally of the center of the upstanding frame 12 and also of the tractor itself.

Steering of the center front wheel assembly which may either be composed of two wheels or a single wheel, as desired, is accomplished through the medium of a worm gear 27 which is fixed on the upper end of the steering post 16 and a worm 28 which meshes with the gear 27 and is mounted on a shaft 29 which extends rearwardly above the tractor through a suitable supporting bracket plate 30 adjacent the rear of the tractor and carrying a control wheel 31 which is the customary steering wheel in tractor constructions.

The sleeve-like housing 17 which receives a portion of the steering post 16 and which is rotatable relative to said post carries at its lower end a gear 32 and a roller 33. The gear 32 operatively meshes with an arcuate rack 34 which forms a portion of the lower cross piece 12a of the vertical frame element 12. As shown in Fig. 4 the rack 34 operates only the upper portion of the frame cross member 12a and the lower portion of said cross member comprises a portion of a trackway for the roller 33. At the other side of the roller 33 from the trackway of the member 12a is a second frame cross member 12b which cooperates to confine said roller against forward movement, but to permit lateral shifting movement. A collar 35 on the steering post 16 supports the sleeve 17, the gear 32 and the roller 33 against downward movement on said steering post.

The upper end of the sleeve 17 is provided with a worm gear 36 which meshes with and is driven by a worm 37 mounted on the forward end of the control shaft 38 which, as shown in Fig. 3, is journalled in the spaced supporting plates 24 as is the shaft 29 in the steering assembly and said shaft 38 extends rearwardly to the bearing bracket 30, the extreme rear end of said shaft 38 carrying a gear 39. A cooperating gear 40 is enmeshed with the gear 39 and is connected to a control wheel 41 and adapted to rotate therewith on the steering control shaft 29. A pair of universal joints 42 are interposed in the shafts 29 and 38 to permit free movement of the front wheel assembly laterally without strain on any of the mechanism.

In operation if the tractor is being driven along a slope the control wheel 41 is operated to rotate the sleeve 17 and gear 32 so that said gear will work along the rack 34 and swing the steering post 16 and the front wheel assembly as a unit in the direction of the downward slope. This will swing the entire forward portion of the tractor on the upwardly positioned bearing 21 as a pivot and the weight of the tractor at its forward end will be shifted up the slope. The main body portion of the tractor will then be in a diagonal position with her forward end thereof pointed up the slope to some extent. A conventional tractor would assume such a diagonal position due to the tendency of the rear wheels to slide down the slope, but as has been pointed out, in a conventional construction the rear and forward wheels of the tractor could not be made to follow the proper path of travel between the crop rows and the crop naturally would be damaged. With my forward wheel assembly shifted down the slope, however, both that assembly and the rear wheels can be maintained in proper position between their respective rows and the crop will not be damaged. Many road graders and similar types of machinery are so constructed that the front wheels will tilt on stub axles but the point of pivotal movement is close to the axles themselves and there is very slight shifting movement of the wheels relative to the frame of the machine. Because the pivotal movement of my front wheel assembly is at the rounded bearing 21 in the upper portion of the vertical frame element 12 I secure a decided lateral shifting movement of the wheels rather than only a tilting action thereof and while tilting of the front wheel assembly is desirable in my construction the important result obtained is a moving of the front wheel assembly from one side of the vehicle to the other in accordance with conditions so that both the front and rear wheel assemblies will follow their proper tracks between the crop rows. This important feature of my device should not be confused with the action of the tiltable wheels in road graders and similar machines for the reason that different problems are present and different functions and results are obtained.

From the foregoing description it will be seen that I have provided an extremely advantageous tractor construction for the cultivation of row crops on hillsides, and while the illustrated form is a preferred one, it will be understood that various changes may be made in the form, details, arrangement and proportions of the various parts without departing from the scope of my invention.

What is claimed is:

1. In a tractor construction, a vertical frame element at the front end thereof extending upwardly substantially as high as the remainder of said tractor, a central front wheel assembly, a normally vertical rotatable steering post connected at its lower end to said wheel assembly and connected at its upper end to the upper portion of said vertical frame element for lateral pivotal movement relative thereto, means for rotating said post to steer said central front wheel assembly, and means for moving said post from its normal vertical position to an angular position laterally of said tractor on the pivot provided by the connection between said post and the upper portion of said vertical frame element.

2. The structure in claim 1 and said rotating means and said shifting means including substantially parallel shafts extending rearwardly above said tractor to a point adjacent the control seat thereof, and gearing connecting said shafts to said steering post and said lateral shifting means, said gearing being mounted for pivotal movement with said steering post as a unit during said lateral shifting movement.

3. In a tractor construction, a vertical frame element at the front end thereof extending upwardly substantially as high as the remainder of said tractor, a central front wheel assembly, a normally vertical rotatable steering post connected at its lower end to said wheel assembly and connected at its upper end to the upper portion of said vertical frame element for lateral pivotal movement relative thereto, means for rotating said post to steer said central front wheel assembly, a sleeve around said steering post, a rack across the lower portion of said vertical frame element, a gear on the lower portion of said sleeve, and meshed with said rack, a bearing guide across the lower portion of said vertical frame element adjacent said rack, a bearing on said steering post and lying in said guide, and means for rotating said sleeve to cause the gear on the lower end thereof to move along said rack and alter the angle of said steering post.

4. A steering unit for a vehicle comprising a member pivotally connected to the vehicle for oscillating movement about a fore and aft extending axis, a generally upright steering post journaled in the member, means for adjusting the member about its axis to control the angle of the steering post in a transverse vertical plane with respect to the vehicle, and at least one ground wheel supporting the member, said ground wheel being connected with the steering post so as to be steerable thereby.

5. A steering unit for a vehicle comprising a member pivotally connected to the vehicle for oscillating movement about a fore and aft extending axis, a generally upright steering post journaled in the member, means for adjusting the member about its axis to control the angle of the steering post in a transverse vertical plane with respect to the vehicle, a pair of ground wheels supporting the member and connected with the steering post for steering action thereby.

EDWARD E. WESTPHAL.